No. 661,904. Patented Nov. 13, 1900.
G. A. BROWNE.
TRUCK LOADING MACHINE.
(Application filed Oct. 28, 1899.)
(No Model.)
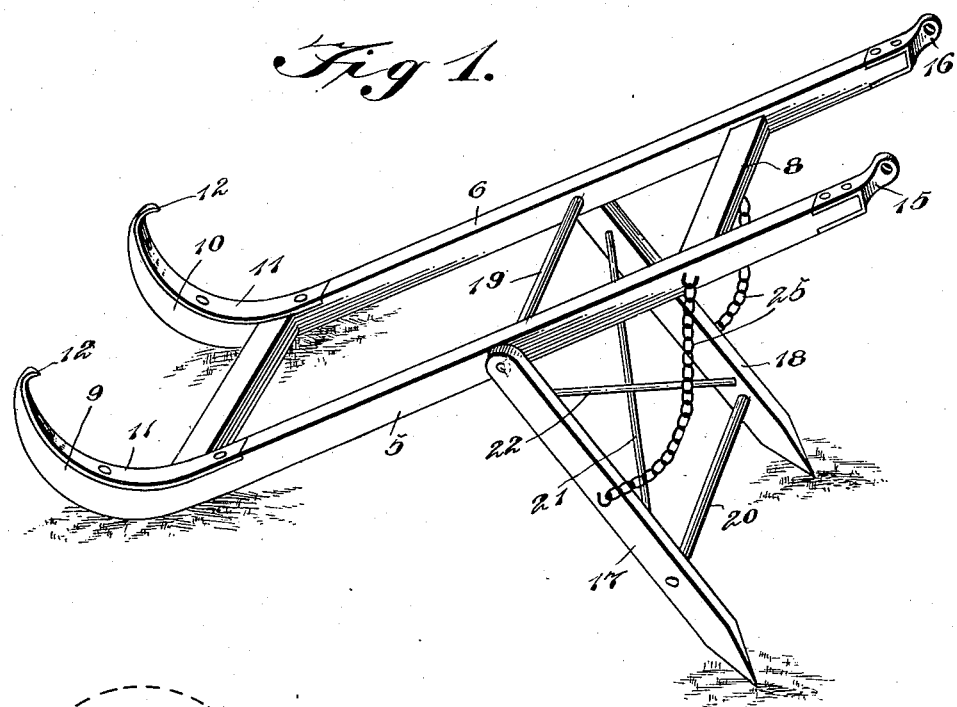
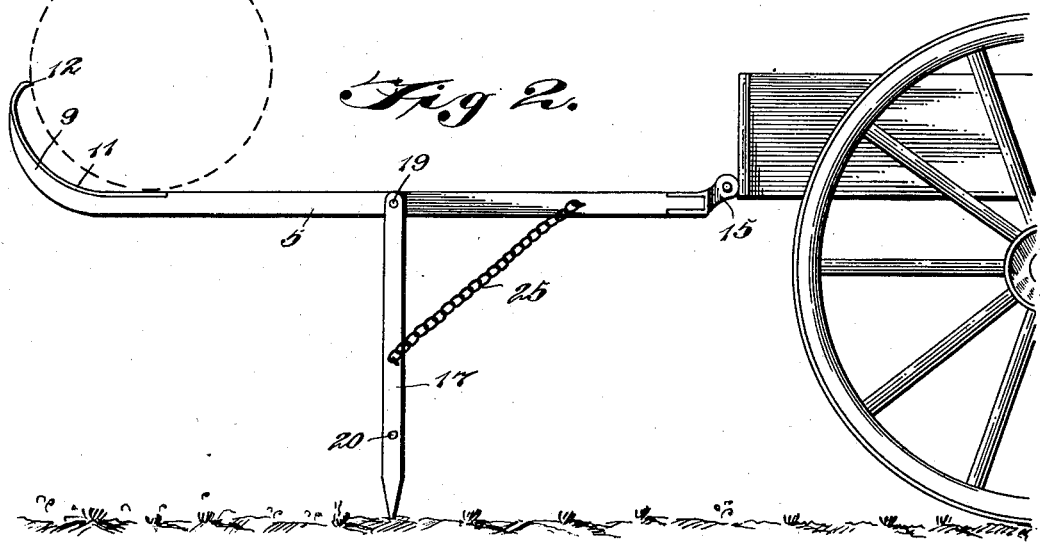
Witnesses
John Maupin.
Geo. H. Chandler.
Geo. A. Browne, Inventor
by C. A. Snow & Co.
Attorneys
THE NORRIS PETERS CO., PHOTO-LITHO., WASHINGTON, D. C.

UNITED STATES PATENT OFFICE.

GEORGE ADRIAN BROWNE, OF WACHAPREAGUE, VIRGINIA.

TRUCK-LOADING MACHINE.

SPECIFICATION forming part of Letters Patent No. 661,904, dated November 13, 1900.

Application filed October 28, 1899. Serial No. 735,142. (No model.)

*To all whom it may concern:*

Be it known that I, GEORGE ADRIAN BROWNE, a citizen of the United States, residing at Wachapreague, in the county of Accomack and State of Virginia, have invented a new and useful Loading-Truck Machine, of which the following is a specification.

This invention relates to trucks in general, and more particularly to that class having no wheels and employed also as skids, the object of the invention being to provide a construction which in its use as a skid may be connected with a wagon in such manner that by moving the wagon forwardly the load on the skid will be raised and deposited in the wagon.

In the drawings forming a portion of this specification, and in which like numerals of reference indicate similar parts in both views, Figure 1 is a perspective view showing the complete truck. Fig. 2 is a side elevation showing the application of the truck to a wagon and the positions of the parts when the truck is raised to deliver the load to the wagon.

Referring now to the drawings, the truck of the present invention comprises the usual sills 5 and 6, having the forward cross-brace 7 and the rear cross-brace 8, which hold the sills rigidly and complete the frame of the truck. As shown in the drawings, the ends of the sills at one end of the truck are turned upwardly to form hooks 9 and 10, the inner faces of which are provided with metal sheathing 11 to resist wear, and which sheathing is provided with projections 12, adapted to engage a barrel or other load and hold it from falling from the truck during the operation of loading. The exterior faces of the hooks may likewise be provided with sheathing to resist wear, and at the opposite ends of the sills there are secured eyepieces 15 and 16, the eyes of which are in alinement transversely of the truck for a purpose which will be presently explained.

At points substantially midway of the ends of the sills and on the outer faces thereof are pivoted supporting-legs 17 and 18, mounted upon the ends of a shaft 19, engaged with perforations in the sills, the lower ends of the legs having a cross-brace 20 to hold them properly spaced and additional diagonal braces 21 and 22. The extremities of the supporting-legs are pointed to better engage the earth or pavement and prevent slipping during the operation of the truck in loading. Chains 25, attached at their ends to the sills and legs, permit the legs to be folded against the sills in the direction of the eye-pieces 15 and 16, but limit the movement of the legs in the opposite direction to a point slightly beyond the perpendicular.

In the operation of this device the eyepieces are engaged with the bar which forms the pintle of the tailboard-hinge of the wagon to be loaded, the outer faces of the hooks at the opposite ends of the sills resting against the ground and the supporting-legs lying with their pointed lower ends against the ground and at an angle thereto, as shown. A barrel may be then rolled onto the truck to lie against the curved inner faces of the hooks or against the projections thereof, after which the wagon is drawn forwardly. The forward movement of the wagon causes the ends of the supporting-legs to engage more firmly with the ground, the upper ends of the legs at their pivotal connections then acting as fulcrums for the sills, and the continued movement of the wagon moves these outer ends of the legs in the arc of a circle and causes the hook ends of the sills to rise. The supporting-legs are preferably of a height somewhat greater than that of the floor of the wagon-body, and hence when the legs have been moved to a vertical position the sills will be inclined to the floor of the wagon-body, and in consequence the barrel will roll or may be readily rolled down the sills and into the wagon. If the load be of that shape that it will not roll, then it may be pushed down the incline, the operation in any event being much easier than that of rolling or shoving up the ordinary inclined skid. After the load has been moved into the wagon-body the wagon may be backed and the truck will move to its original position ready for a second load, which may be raised in the same manner as the previous one. The presence of the chains 25 insures the termination of the pivotal movement of the sills upon the legs at the proper point and prevents the truck from moving downwardly should the wagon be moved ahead too far.

It will of course be understood that in practice modifications in structure may be made and any suitable materials and proportions may be used for the various parts without departing from the spirit of the invention.

What is claimed is—

1. A loading-truck comprising sills mutually connected to form a frame, the ends of the sills at one end of the frame being turned upwardly and the ends of the sills at the other end of the frame having eyes for pivotal connection with a wagon-body, and supporting-legs pivoted at their ends to the sills between the ends of the latter and having their free ends adapted for engagement with the ground.

2. A loading-truck comprising sills mutually connected to form a frame, the ends of the sills at one end of the frame being turned upwardly to form hooks which latter are provided with projections, and the opposite ends of the sills having eyes for engagement pivotally with a wagon-body, supporting-legs pivoted at one end to the sills and having their opposite ends adapted for engagement with the ground, and flexible connections between the sills and the free portions of the leg to limit the pivotal movements of the legs in one direction.

In testimony whereof I have signed my name to this specification in the presence of two subscribing witnesses.

GEORGE ADRIAN BROWNE.

Witnesses:
EDWIN T. POWELL,
JNO. S. PARSONS.